(12) United States Patent
Suzuki et al.

(10) Patent No.: US 11,136,640 B2
(45) Date of Patent: Oct. 5, 2021

(54) HEAT TREATMENT METHOD AND HEAT TREATMENT DEVICE

(71) Applicant: JTEKT CORPORATION, Osaka (JP)

(72) Inventors: Kensuke Suzuki, Kashiwara (JP); Wataru Yoshida, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 266 days.

(21) Appl. No.: 16/315,147

(22) PCT Filed: Jul. 14, 2017

(86) PCT No.: PCT/JP2017/025783
§ 371 (c)(1),
(2) Date: Jan. 3, 2019

(87) PCT Pub. No.: WO2018/012626
PCT Pub. Date: Jan. 18, 2018

(65) Prior Publication Data
US 2019/0309386 A1  Oct. 10, 2019

(30) Foreign Application Priority Data

Jul. 14, 2016  (JP) .............................. JP2016-139584

(51) Int. Cl.
*C21D 9/40* (2006.01)
*C21D 1/18* (2006.01)
(Continued)

(52) U.S. Cl.
CPC ................. *C21D 9/40* (2013.01); *C21D 1/18* (2013.01); *C21D 1/42* (2013.01); *C21D 1/667* (2013.01);
(Continued)

(58) Field of Classification Search
CPC .............. C21D 9/40; C21D 1/18; F16C 19/36
See application file for complete search history.

(56) References Cited

U.S. PATENT DOCUMENTS

2005/0039830 A1\* 2/2005 Christofis et al.
2016/0108486 A1\* 4/2016 Yoshida ................ C22C 38/002
148/575
(Continued)

FOREIGN PATENT DOCUMENTS

| JP | H06-172866 A | | 6/1994 |
|----|--------------|---|--------|
| JP | H06172866 | \* | 6/1994 |

(Continued)

OTHER PUBLICATIONS

JPH06172866A English translation (Year: 2021).\*
(Continued)

*Primary Examiner* — Nicholas A Wang
*Assistant Examiner* — Jiangtian Xu
(74) *Attorney, Agent, or Firm* — Oliff PLC

(57) ABSTRACT

In a heat treatment method for obtaining a bearing ring for an annular roller bearing whose thickness changes in an axial direction, the heat treatment method includes (A) applying a quenching process to a work which is annular, made of high carbon chromium bearing steel, and having a thickness changing in an axial direction, (B) applying a tempering process to the work which is quenched to entirely soak the work in cooling liquid and inductively heat the work in a state that the work is soaked in the cooling liquid, and (C) applying a finishing process to the work which is tempered.

2 Claims, 12 Drawing Sheets

(51) Int. Cl.
*C21D 1/42* (2006.01)
*C21D 1/667* (2006.01)
*F16C 33/64* (2006.01)
*F16C 19/36* (2006.01)

(52) U.S. Cl.
CPC .............. *F16C 19/36* (2013.01); *F16C 33/64* (2013.01); *F16C 19/364* (2013.01); *F16C 2204/66* (2013.01); *F16C 2204/70* (2013.01); *F16C 2223/10* (2013.01); *Y02P 10/25* (2015.11)

(56) References Cited

U.S. PATENT DOCUMENTS

| | | | |
|---|---|---|---|
| 2016/0108961 A1 | 4/2016 | Yoshida et al. | |
| 2016/0124344 A1 | 5/2016 | Kojo | |
| 2017/0314117 A1 | 11/2017 | Yoshida | |
| 2018/0305779 A1 | 10/2018 | Yoshida et al. | |
| 2019/0107152 A1 | 4/2019 | Suzuki et al. | |

FOREIGN PATENT DOCUMENTS

| | | |
|---|---|---|
| JP | 2007-294466 A | 11/2007 |
| JP | 2009-007595 A | 1/2009 |
| JP | 2012-162799 A | 8/2012 |
| JP | 2014-212848 A | 11/2014 |
| JP | 2014-212995 A | 11/2014 |
| JP | 5895493 B2 | 3/2016 |
| JP | 2016-075753 A | 5/2016 |
| JP | 2016-079466 A | 5/2016 |
| JP | 2016-080097 A | 5/2016 |
| JP | 2016-090736 A | 5/2016 |
| JP | 2017-187104 A | 10/2017 |
| JP | 2017-197829 A | 11/2017 |

OTHER PUBLICATIONS

Sep. 19, 2017 International Search Report issued in International Patent Application No. PCT/JP2017/025783.

Sep. 19, 2017 Written Opinion of the International Searching Authority issued in International Patent Application No. PCT/JP2017/025783.

Jun. 29, 2020 Office Action issued in Chinese Patent Application No. 201780042913.1.

Jun. 30, 2020 Office Action issued in Japanese Patent Application No. 2016-139584.

\* cited by examiner

[FIG. 1]
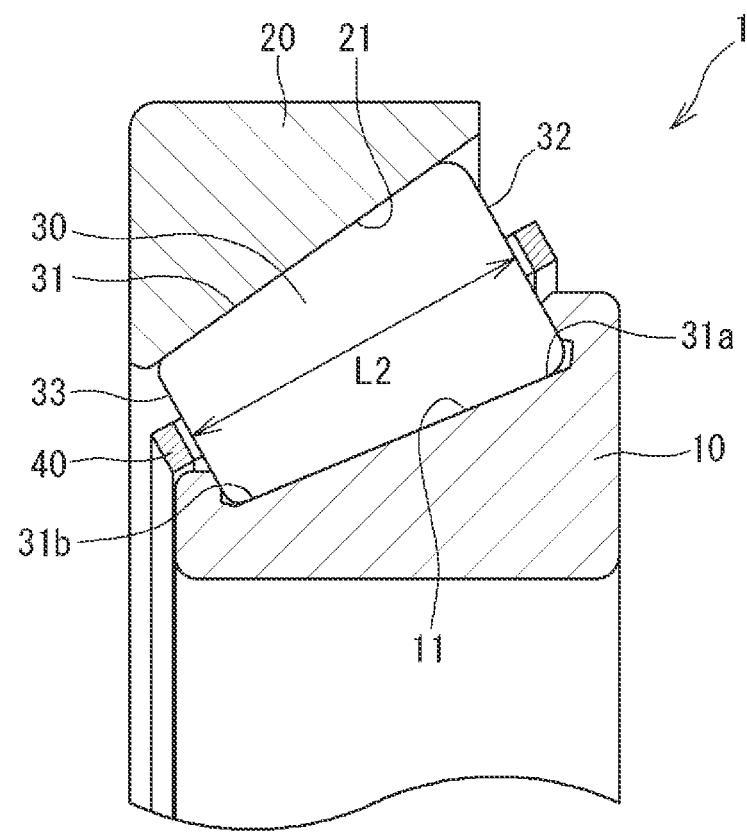

[FIG. 2]
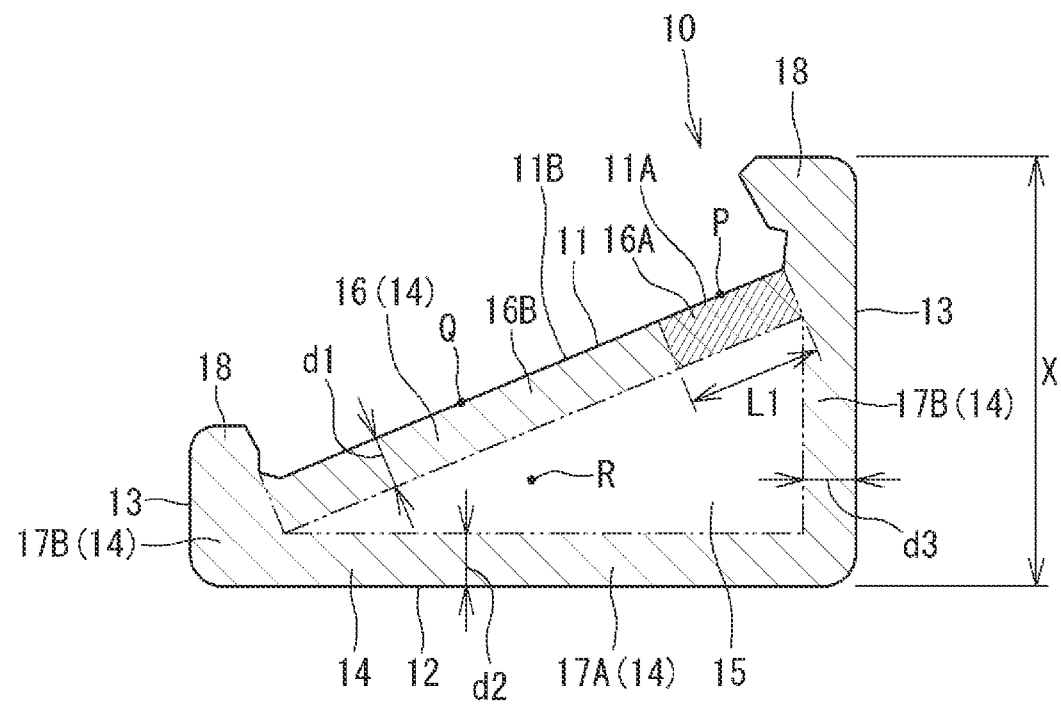

[FIG. 3]
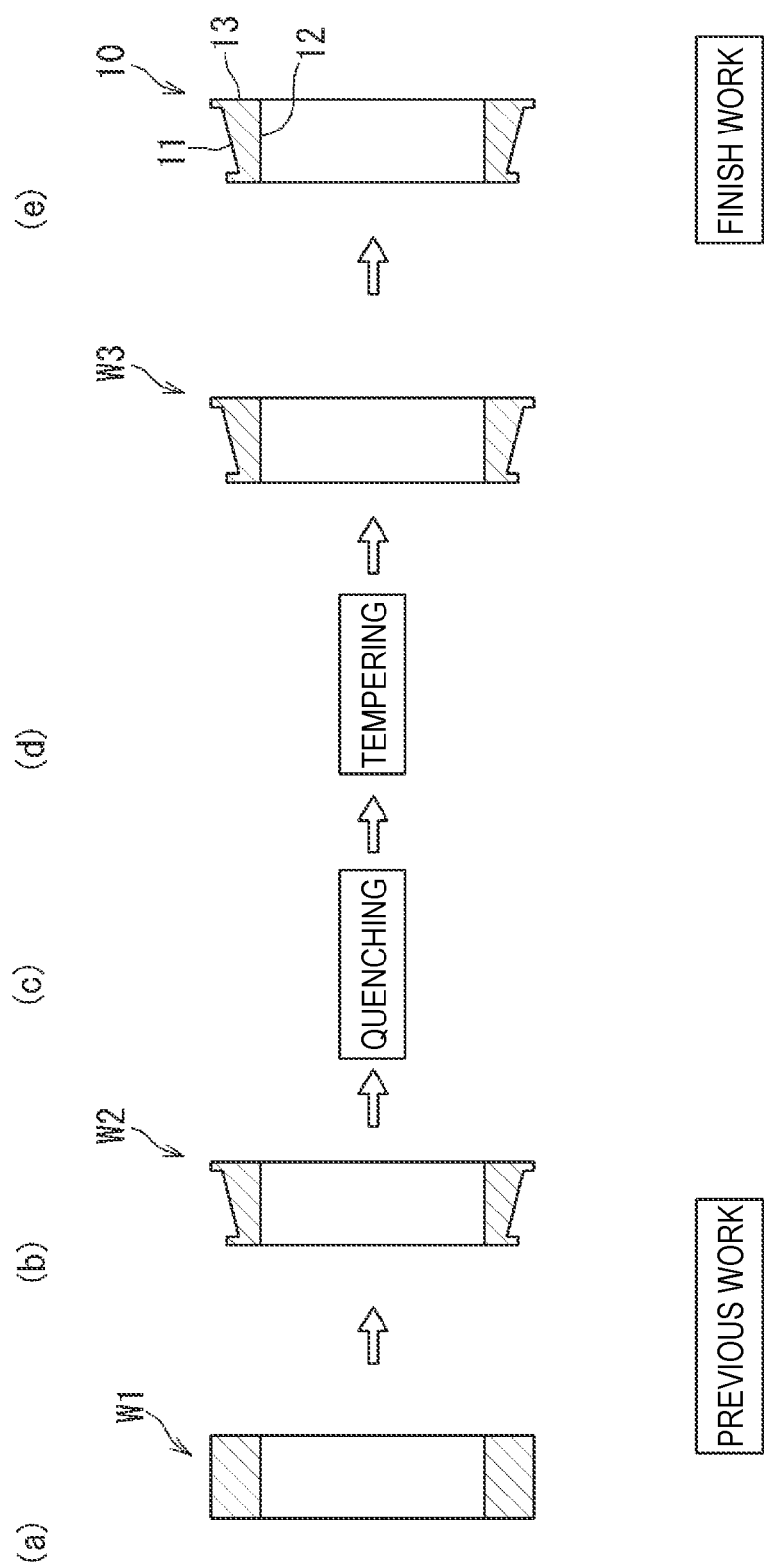

[FIG. 4]
(a) 
(b) 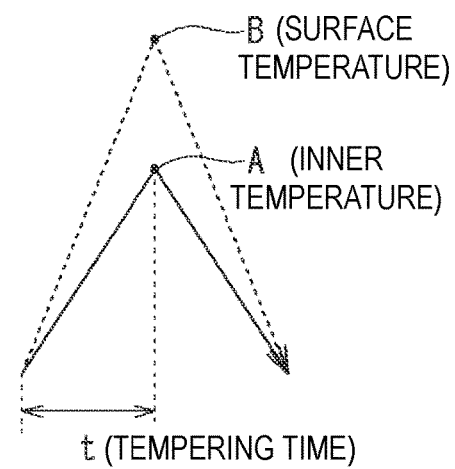

[FIG. 5]
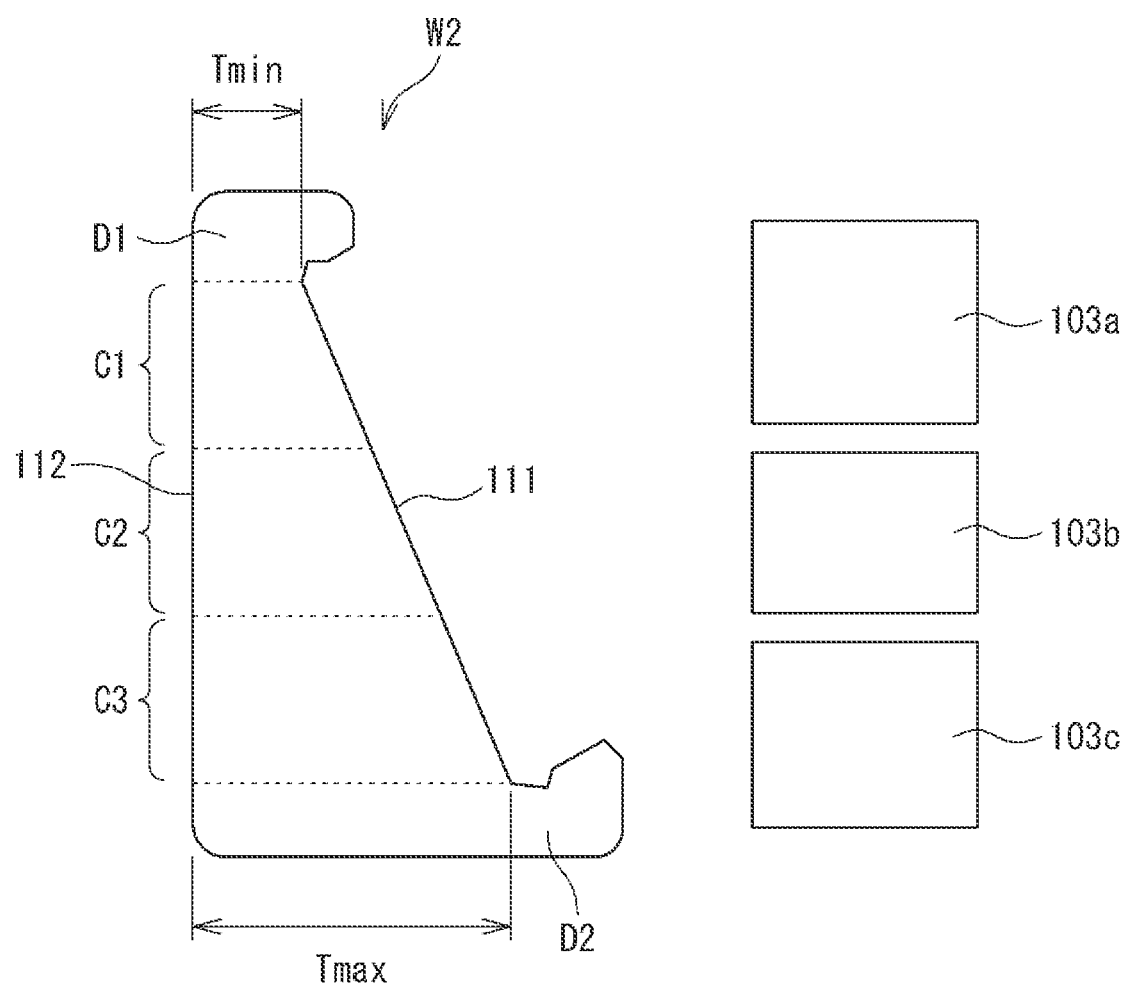

[FIG. 6]
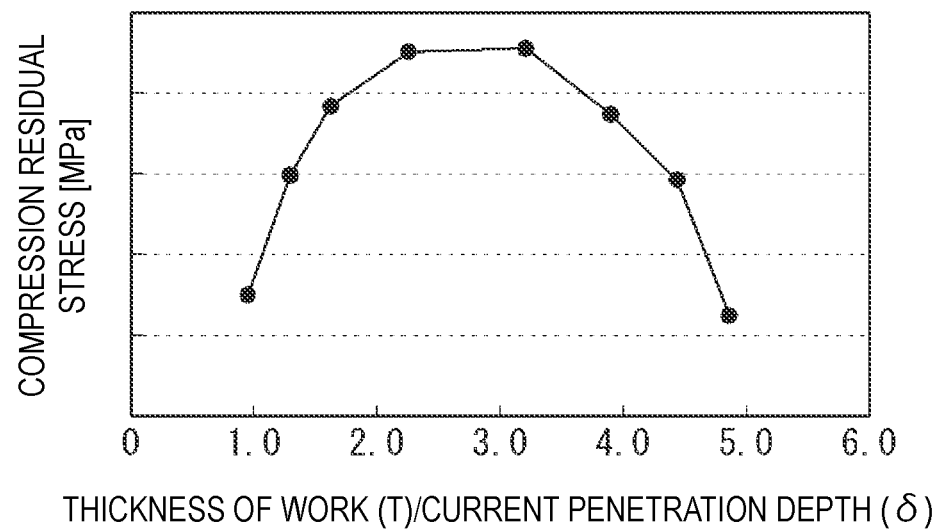

[FIG. 7]
(a)
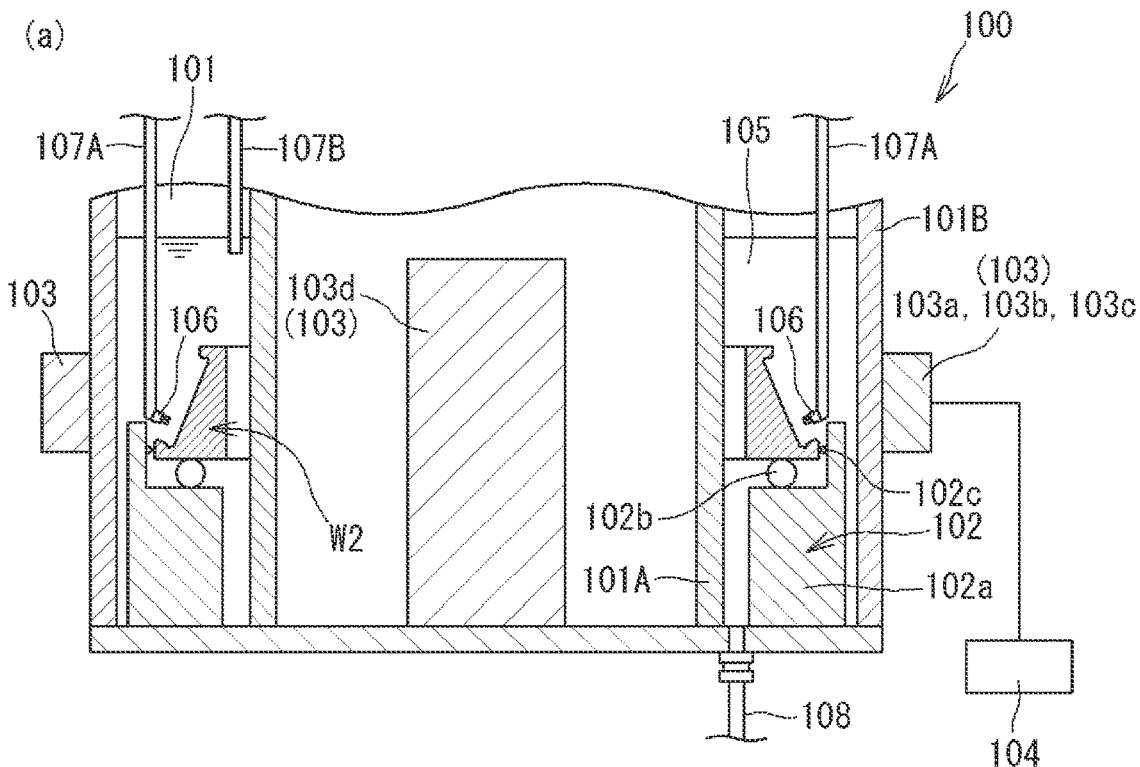
(b)
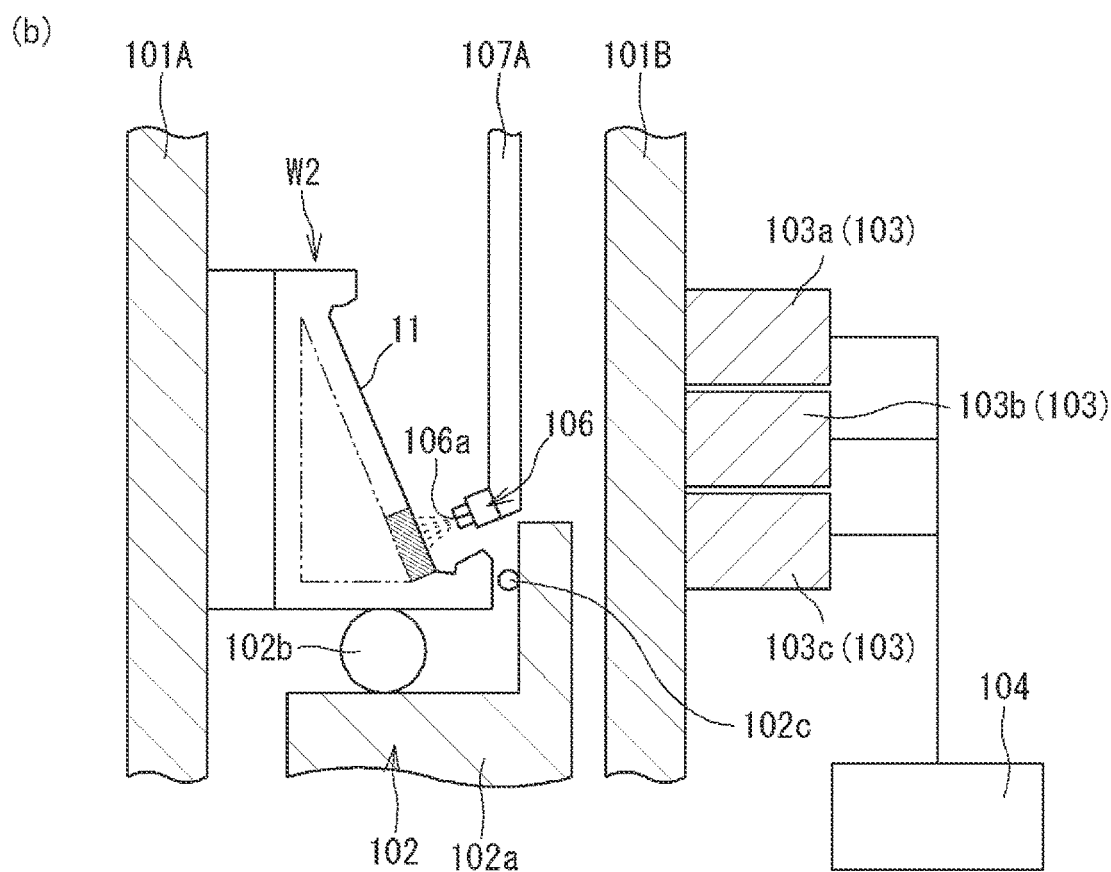

[FIG. 8]
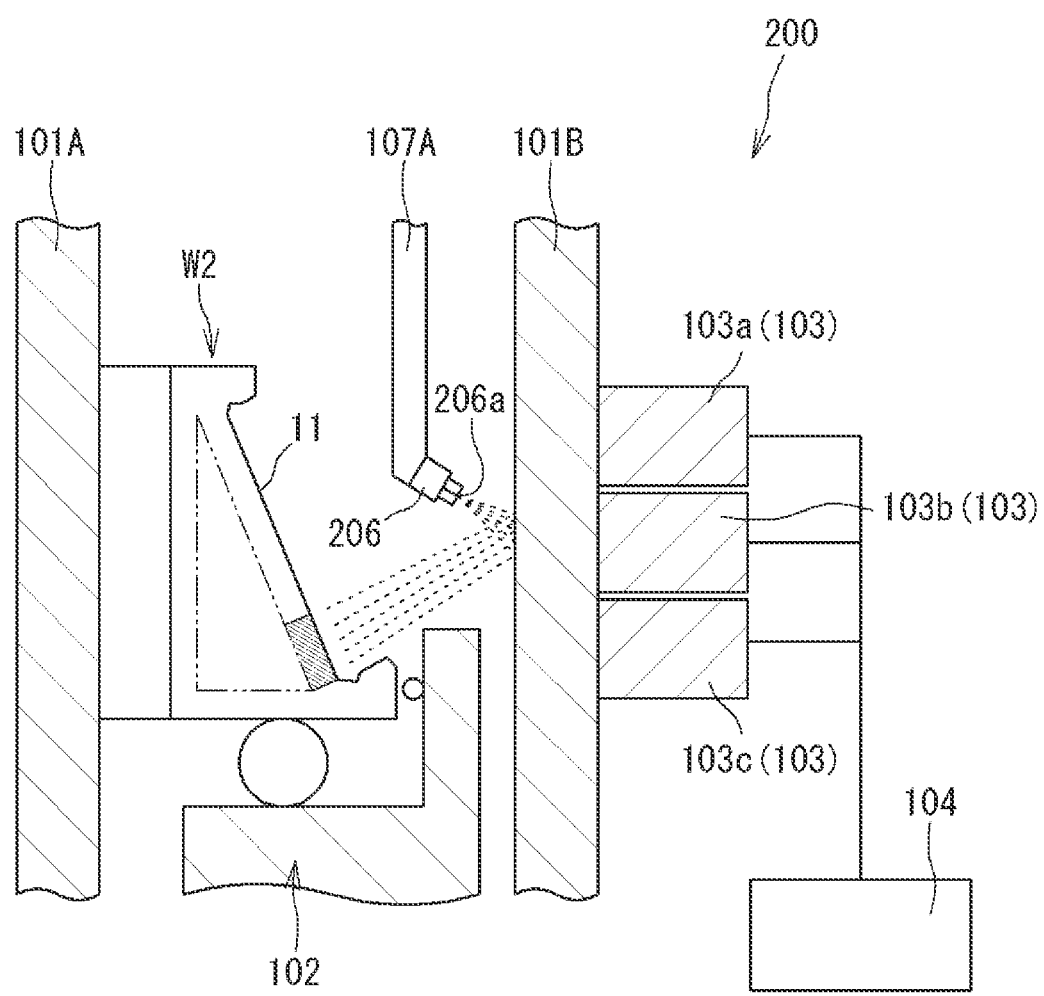

[FIG. 9]
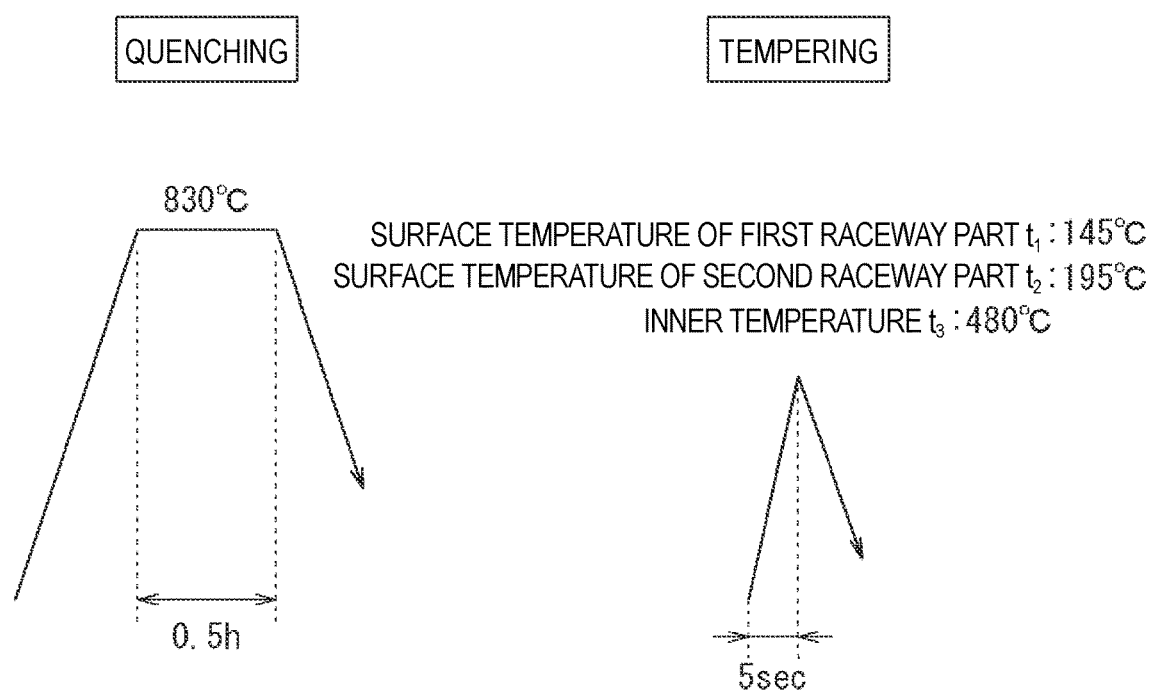

[FIG. 10]
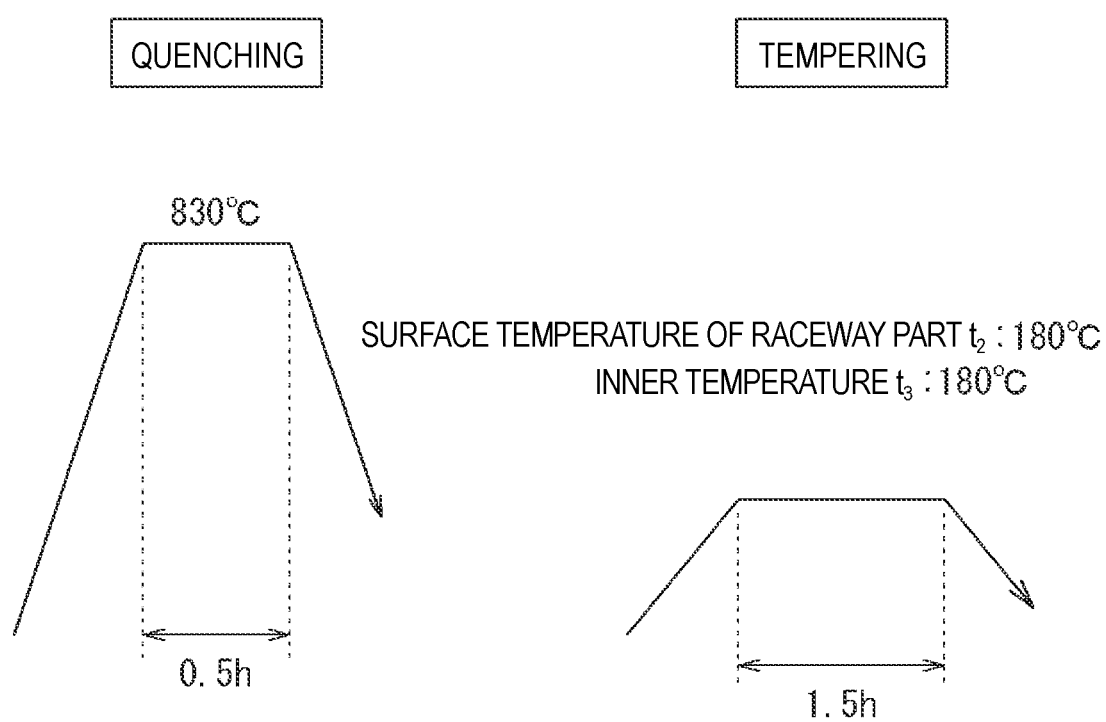

[FIG. 11]
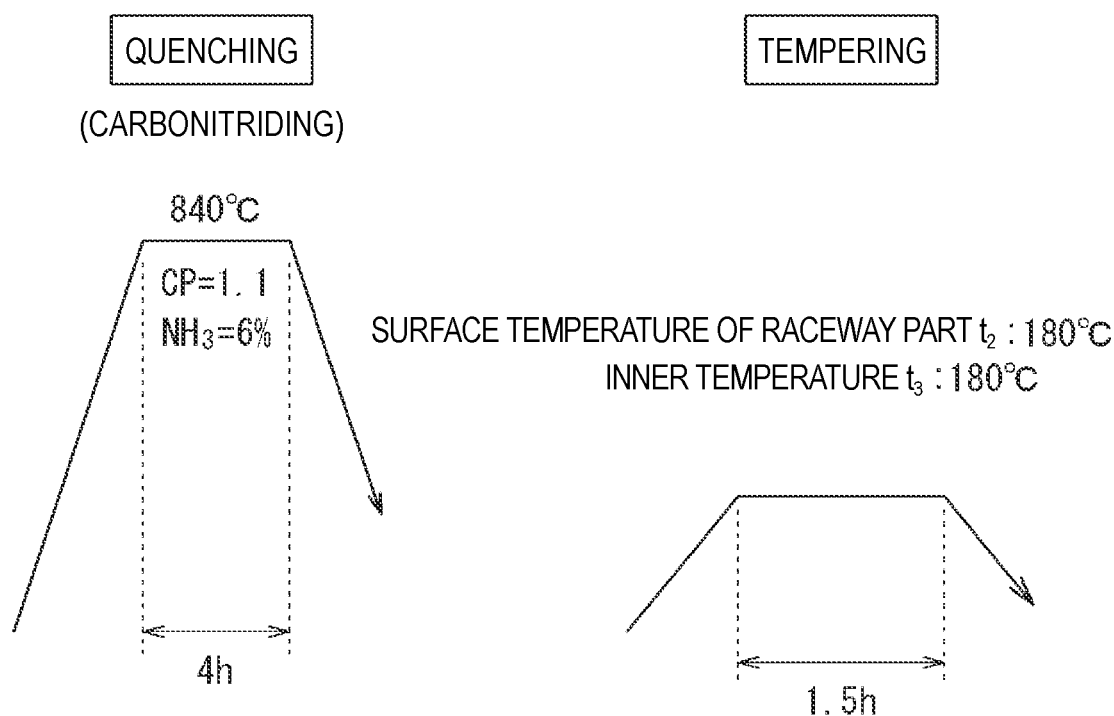

[FIG. 12]
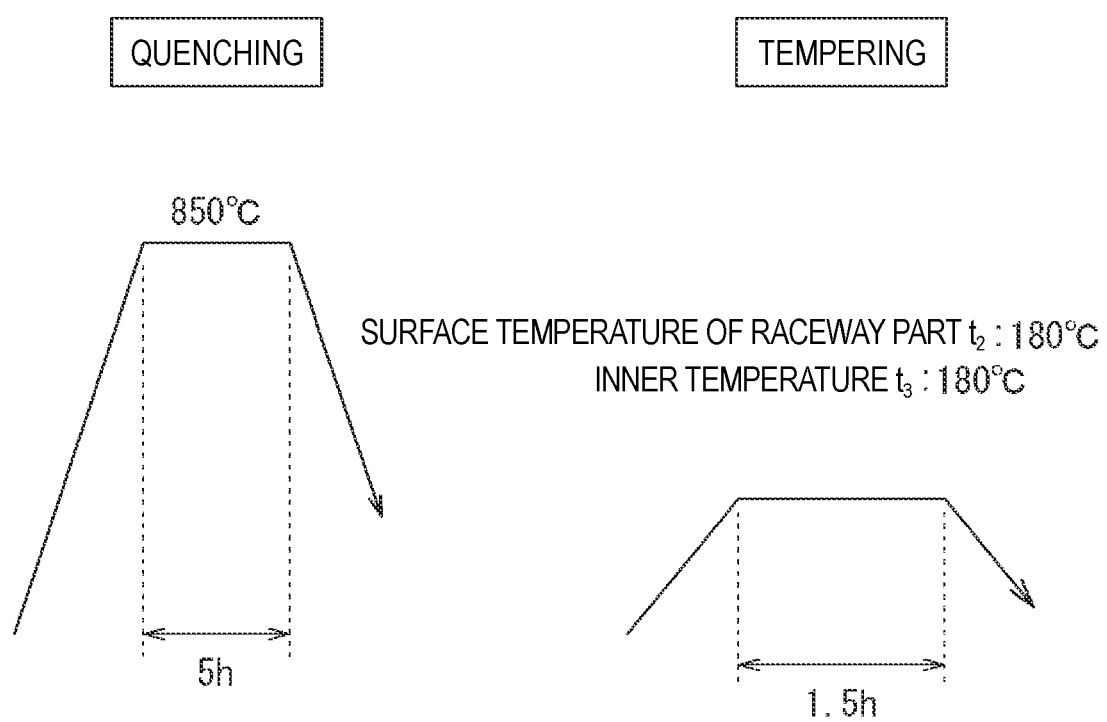

HEAT TREATMENT METHOD AND HEAT TREATMENT DEVICE

TECHNICAL FIELD

An embodiment of the present invention relates to a heat treatment method and a heat treatment device for obtaining a bearing ring for a roller bearing.

BACKGROUND ART

A bearing ring for a bearing which forms a roller bearing used in a motor vehicle or an industrial machine has a raceway surface which relatively comes into rolling contact with a rolling element. The above-described raceway surface is liable to receive an impact from the rolling element by the rolling contact with the rolling element.

Thus, when the bearing ring for the bearing is manufactured, various methods are proposed by which mechanical characteristics of the bearing ring for the bearing are improved.

For instance, as a method which achieves a high hardness of the raceway surface to improve a rolling life of the roller bearing, a method is known that a carbonitriding process is applied to steel for the bearing when the bearing ring for the bearing is manufactured. However, the carbonitriding process requires a heat treatment for a long time, so that an increase of cost due to the heat treatment cannot be avoided.

Further, for instance, in Patent Literature 1, as a heat treatment method which can give an excellent impact resistance and high collapse strength to an annular work made of high carbon chromium bearing steel such as SUJ2, a heat treatment method is proposed that a quenching process is applied to the annular work, and then, a tempering process for inductively heating the annular work is carried out under a condition that a surface temperature is lower by 40° C. or more than an internal temperature. The Patent Literature 1 discloses that the bearing ring for the bearing obtained by using the above-described heat treatment method improves a rolling fatigue life of the roller beating.

CITATION LIST

Patent Literature

[Patent Literature 1] JP-A-2016-79466

SUMMARY OF INVENTION

Technical Problem

When the bearing ring for the bearing is obtained by using the heat treatment method disclosed in the Patent Literature 1, the rolling fatigue life of the roller bearing can be improved. However, when a bearing ring for a roller bearing is obtained in which a thickness changes in an axial direction as in a bearing ring for a bearing of a tapered roller bearing, since the thickness of a work changes in the axial direction, unevenness in heating resulting from a difference in thickness may possibly arise during the inductively heating in the heat treatment method disclosed in the Patent Literature 1. Thus, the above-described rolling fatigue life occasionally can not be fully improved. Especially, when a bearing ring for a bearing having a large diameter is obtained, since a variation of the thickness in the work is apt to be large, it may be possibly difficult to improve the rolling fatigue life.

Further, on the raceway surface of the bearing ring for the roller bearing which forms the roller bearing, a part is generated which receives a high load from an end part of a rolling surface of a roller so that a contact pressure with the roller is high (what is called an edge load) in a part of the raceway surface. Thus, the rolling fatigue life of the roller bearing depends on the life of the part of the raceway surface which receives the high load.

Solution to Problem

In a first embodiment of the present invention, a heat treatment method for obtaining a bearing ring for an annular roller bearing, the heat treatment method includes (A) applying a quenching process to a work which is annular, made of high carbon chromium bearing steel, and having a thickness changing in an axial direction, (B) applying a tempering process to the work which is quenched to entirely soak the work in cooling liquid and inductively heat the work in a state that the work is soaked in the cooling liquid, and (C) applying a finishing process to the work which is tempered. The process (B) is carried out (B1) in such a way that the work is divided into a plurality of blocks along the axial direction in accordance with the thickness and the block in which the thickness is thicker is inductively heated in a lower frequency than the thinner block (B2) under a state that a flow of the cooling liquid is generated so as to collect the cooling liquid to a part in which a first raceway surface of the work is formed in the cooling liquid in which the work is soaked.

According to the first embodiment, since, in a state that a work is soaked in cooling liquid, a tempering process is carried out by an inductively heating, an internal temperature of the work is higher than a surface temperature during the tempering process. Accordingly, the bearing ring for the roller bearing can be obtained which has the inner layer part and the surface layer part surrounding the periphery and the surface of the surface layer part is harder than the inner layer part. At this time, since the work is divided into a plurality of blocks in accordance with thickness and the blocks are respectively inductively heated in accordance with conditions meeting their thickness, an occurrence of unevenness in heating resulting from the difference in thickness can be avoided.

Further, since the tempering process is carried out under the state that the work is soaked in the cooling liquid, the internal temperature is higher than the surface temperature. Accordingly, to the surface layer side of the work, a low temperature tempering process small in volumetric shrinkage is applied. To the inner part, a high temperature tempering process large in volumetric shrinkage is applied. To the raceway surface of the bearing ring for the roller bearing obtained by the difference of the volumetric shrinkage, the compression residual stress is given.

Further, the above-described tempering process is carried out under a state that a flow of the cooling liquid is generated so as to collect the cooling liquid to the part which forms the first raceway surface of the work in the cooling liquid in which the work is soaked. Accordingly, in the tempering process, the part forming the first raceway surface is cooled by a cooling power higher than that of other part. As a result, the formed first raceway surface has the compression residual stress higher than that of other part.

By using the bearing ring for the roller bearing obtained by the above-described heat treatment method, the roller bearing excellent in its rolling fatigue life can be provided.

In a second embodiment of the present invention, in the process (B), an injection nozzle which injects the cooling liquid is used and an injection opening of the injection nozzle is opposed to the part in which the first raceway surface is formed to inject the cooling liquid to the part in which the first raceway surface is formed from the injection opening.

In this case, by the cooling liquid injected from the injection nozzle, the flow of the cooling liquid can be efficiently generated so as to collect the cooling liquid to the part which forms the first raceway surface in the cooling liquid in which the work is soaked. Thus, the part which forms the first raceway surface is particularly suitably cooled by the cooling power higher than that of the other part.

In a third embodiment of the present invention, in the (B1), a frequency f in which the blocks are respectively inductively heated is set in such a way that a ratio of the thickness T (mm) of each block to a current penetration depth δ (mm) represented by a below-described expression (1) satisfies a below-described inequality (2).

$$\delta = 5.03\sqrt{\rho/\mu f} \quad (1)$$

The ρ is a specific resistance (μΩ·mm) at 20° C. of the work, the μ is a relative magnetic permeability and the f is the frequency (Hz) of the inductively heating.

$$1.5 \leq T/\delta \leq 4.0 \quad (2)$$

In this case, the work is heated without unevenness and the high compression residual stress is more suitably applied to the surface layer part.

In a fourth embodiment of the present invention, the work includes an inner layer part, a surface layer part which surrounds an entire part of a periphery of the inner layer part and has Vickers hardness on a surface higher than that of the inner layer part, a first raceway surface having a compression residual stress and including a part which comes into contact with at least one end of a rolling surface of a roller in an axial direction and a second raceway surface having a compression residual stress lower than that of the first raceway surface are provided. The thickness changes in the axial direction.

The heat treatment device can heat even the work whose thickness changes in an axial direction without unevenness. Further, the heat treatment device can cool only a specific part of the work by a high cooling power. Accordingly, the heat treatment device is suitable for a device which carries out the tempering process in the heat treatment method of the present invention.

In a fifth embodiment of the present invention, in the heat treatment device of the fourth embodiment, an injection opening of the injection nozzle is preferably arranged so as to be opposed to the work.

In this case, a part of the work can be more effectively cooled.

Advantageous Effects of Invention

According to the present invention, the bearing ring for the roller bearing excellent in its rolling fatigue life can be inexpensively provided.

BRIEF DESCRIPTION OF DRAWINGS

FIG. 1 is a sectional view of main parts of a tapered roller bearing.

FIG. 2 is a sectional view of main parts of an inner ring of the tapered roller bearing shown in FIG. 1.

FIG. 3 is a process view of a heat treatment method for obtaining the inner ring shown in FIG. 2.

FIG. 4 is a process view which explains a quenching process and a tempering process shown in FIG. 3.

FIG. 5 is a view schematically showing a relation between a work and a heating member in a first embodiment.

FIG. 6 is a graph showing a summary of a relation between a ratio (T/δ) of thickness T (mm) to a current penetration depth δ (mm) and a compression residual stress.

FIG. 7(a) is a schematic explanatory view showing a heat treatment device according to the first embodiment. FIG. 7(b) is an enlarged view of main parts of FIG. 7(a).

FIG. 8 is an enlarged view of main parts showing a heat treatment device according to a second embodiment.

FIG. 9 is a diagram showing a heat treatment condition in an example 1.

FIG. 10 is a diagram showing a heat treatment condition in a comparative example 1.

FIG. 11 is a diagram showing a heat treatment condition in a comparative example 2.

FIG. 12 is a diagram showing a heat treatment condition in a comparative example 3.

DESCRIPTION OF EMBODIMENTS

Now, initially, one example of a bearing ring for a roller bearing which can be obtained by using a heat treatment method and a heat treatment device of the present invention and one example of a roller bearing using the bearing ring for the roller bearing will be described.

The heat treatment method of the present invention is a heat treatment method for obtaining the bearing ring for the roller bearing whose thickness changes in an axial direction. Here, a bearing ring for a tapered roller bearing will be described as an example.

(Tapered Roller Bearing)

FIG. 1 is a sectional view of main parts of a tapered roller bearing.

The tapered roller bearing 1 includes an inner ring 10 having an inner ring raceway surface 11 formed with a conical surface in an outer periphery, an outer ring 20 having an outer ring raceway surface 21 formed with a conical surface in an inner periphery, a plurality of tapered rollers 30 having rolling surfaces 31 formed with conical surfaces in outer peripheries and arranged so as to freely roll between both the raceway surfaces 11 and 21 and a holder 40 which holds the plurality of tapered rollers 30 at prescribed intervals in a circumferential direction. The inner ring 10, the outer ring 20 and the tapered rollers 30 are formed with high carbon chromium bearing steel such as JIS, SUj2, JIS SUJ3.

In the tapered roller bearing 1, the rolling surface 31 of the tapered roller 30 comes into rolling contact with the inner ring raceway surface 11 and the outer ring raceway surface 21 respectively. At this time, the rolling surface 31 of the tapered roller 30 comes into contact with the inner ring raceway surface 11 and the outer ring raceway surface 21 under a high contact pressure in edge parts 31a and 31b to the roller end faces 32 and 33 of the rolling surface 31 (both end parts of the roller surface 31 in the axial direction), so that what is called an edge load is generated in the vicinity of the edge parts 31a and 31b.

Especially, in the inner ring 10 side of the tapered roller bearing 1, the contact pressure of the edge part 31a of a large diameter side of the rolling surface 31 and the inner ring raceway surface 11 of the inner ring 10 is high.

(Bearing Ring for Tapered Roller Bearing)

FIG. 2 is a sectional view of main parts of the inner ring of the tapered roller bearing shown in FIG. 1.

The inner ring 10 shown in FIG. 2 has an inner layer part 15 and a surface layer part 14 which surrounds an entire part of a periphery of the inner layer part 15. The surface layer part 14 is formed so as to have Vickers hardness (Vickers hardness reference) relatively higher than that of the inner layer part 15. Accordingly, the inner ring 10 is excellent in its collapse strength and impact resistance.

In this specification, the "Vickers hardness" is referred to as a value measured by applying a Vickers pressure member to a surface of the bearing ring for the roller bearing (for instance, the inner ring) or a cut surface formed by cutting the bearing ring for the roller bearing along a radial direction.

The inner layer part 15 has a texture made of tempered martensite or a texture made of sorbite. Further, the inner layer part 15 has the Vickers hardness of 450 HV or higher and lower than 550 HV. Thus, excellent collapse strength and an impact resistance are ensured.

The surface layer part 14 is formed so as to surround the entire part of the periphery of the inner layer part 15, and has a texture made of tempered martensite and a surface of the Vickers hardness higher than the Vickers hardness of the inner layer part 15. The surface layer part 14 has the surface of the Vickers hardness of 700 HV or higher and lower than 800 HV. Thus, an excellent impact resistance and a long rolling fatigue life are ensured.

The Vickers hardness of the surface layer part 14 may be gradually lower toward the inner layer part 15 from the surface of the surface layer part 14.

The surface layer part 14 includes a raceway part 16 having as a surface, the inner ring raceway surface 11 which comes into rolling contact with the tapered roller 30, a non-raceway part 17A having an inner peripheral surface 12 of the inner ring 10 as a surface and a non-raceway part 17B having a surface of a collar part 18 and a side surface 13 of the inner ring 10 as a part of a surface.

The surface layer part 14 (the raceway part 16, the non-raceway parts 17A, 17B) preferably has the Vickers hardness of the surface located within the above-described range. Further, the surface layer part preferably has an area of a prescribed depth having the Vickers hardness of 700 HV or higher toward the inner layer part 15 from the surface (refer it to as a high hardness surface layer, hereinafter (see a bias line part in FIG. 2. The bias line part is schematically shown in order to explain a depth of the high hardness surface layer and does not necessarily show an actual dimension of the high hardness surface layer)).

The depth d1 of the high hardness surface layer in the raceway part 16 preferably satisfies a below-described inequality (3) relative to a maximum shearing stress depth Z0 when the inner ring 10 is used.

$$3Z0 \leq d1 < 8Z0 \quad (3)$$

When the above-described depth d1 is smaller than three times as large as the maximum shearing stress depth Z0, fatigue strength of the surface may be possibly lowered to lower the rolling fatigue life of the inner ring 10. On the other hand, when the above-descried depth d1 is eight times as large as the maximum shearing stress depth Z0 or higher, a rate occupied by an area made of a texture softer than that of the surface may be reduced. Thus, a toughness of the inner ring 10 may be possibly insufficient.

The maximum shearing stress depth Z0 when the bearing ring for the roller bearing is used is different depending on rated load, however, the depth is generally about 1 to 0.2 mm.

The depth d2 of the high hardness surface layer in the non-raceway part 17A and the depth d3 of the high hardness surface layer in the non-raceway part 17B are both preferably satisfy a below-described inequality (4) in a ratio to a maximum thickness x in a radial direction of the inner ring 10 (d2/x, d3/x).

$$0.02 < (d2/x, d3/x) \leq 0.04 \quad (4)$$

In such a way, sufficient collapse strength and impact resistance are suitably ensured.

The raceway part 16 includes a first raceway part 16A provided so as to include a part (an edge load part) in which a contact pressure with the rolling surface 31 of the tapered roller 30 is high and a second raceway part 16B except the first raceway part 16A.

The first raceway part 16A has both of a compression residual stress and the Vickers hardness of a surface (a first raceway surface 11A) higher than the compression residual stress and the Vickers hardness of a surface (a second raceway surface 11B) of the second raceway part 16B. Thus, mechanical characteristics of the first raceway part 16A are enhanced, and a rolling fatigue life of the tapered roller bearing using the inner ring 10 is lengthened.

The compression residual stress of the first raceway surface 11A is preferably 300 MPa or higher. Thus, the inner ring 10 is more hardly broken, so that the inner ring suitably achieves an extension of the rolling fatigue life.

The compression residual stress of the first raceway surface 11A is more preferably 340 MPa or higher in view of an achievement of a longer life On the other hand, an upper limit of the compression residual stress of the first raceway surface 11A is not especially limited. However, when the compression residual stress is too high, an extreme value of a tension residual stress is generated or a fragile texture is formed due to a plastic deformation. Accordingly, the upper limit is preferably 1000 MPa.

The compression residual stress of the second raceway surface 11B is preferably 50 MPa or higher, which is suitable for lengthening the rolling fatigue life.

On the other hand, in the compression residual stress of the second raceway surface 11B, its upper limit is not especially limited as long as the compression residual stress is lower than the compression residual stress of the first raceway surface 11A.

In the raceway part 16 of the inner ring 10, an axial length L1 of the first raceway part 16A is preferably 10 to 30% as long as a roller width L2 (see FIG. 1) of the tapered roller 30.

When the above-described length L1 is smaller than 10% as long as the roller width L2, in the heat treatment method of the present invention, it is not easy to position the first raceway surface 11A so as to be assuredly formed in the edge load part. On the other hand, when the length L1 exceeds 30% as long as the roller width L2, it is difficult to apply the high compression residual stress exceeding 250 MPa to the first raceway surface 11A.

In such an inner ring 10, the first raceway surface 11A high in its compression residual stress is provided in a position including the edge load part in which the contact pressure with the tapered roller 30 is high. Accordingly, the roller bearing using the inner ring 10 is excellent in its rolling fatigue life.

(Others)

In the inner ring 10, in a large diameter side (a right side in FIG. 2) of the raceway surface 11, the first raceway surfaced 11A having the high compression residual stress is provided. On the other hand, as described above, in the tapered roller bearing, the edge load parts may be generated in both end sides of the tapered roller in the axial direction. Accordingly, in the inner ring 10, the first raceway surface may be provided in two positions of a large diameter side and a small diameter side of the raceway part 16.

In the tapered roller bearing, the contact pressure is ordinarily higher in the edge load part generated in the large diameter side of the tapered roller than that in the edge load generated in the small diameter side. Accordingly, even in the inner ring 10 in which the first raceway part 16A is provided in one position of the large diameter side, the rolling fatigue life can be satisfactorily lengthened.

The bearing ring for the roller bearing obtained in the embodiment of the present invention is not limited to the inner ring of the tapered roller bearing, and may be an outer ring for the tapered roller bearing. Further, when the bearing ring for the roller bearing is such a bearing ring the thickness of which changes in the axial direction, for instance, a bearing ring for a bearing such as a self-aligning roller bearing may be adopted.

Further, in the bearing ring for the roller bearing obtained in the embodiment of the present invention, when the bearing ring for the roller bearing has the thickness changing along the axial direction, the thickness is not especially limited. However, the heat treatment method of the present invention is preferably and suitably applied to a bearing ring for a roller bearing in which a minimum thickness in a raceway surface is 5 mm or larger and a difference between a minimum thickness in the raceway surface (Tmin in FIG. 5) and a maximum thickness (Tmax in FIG. 5) is 2 mm or larger.

First Embodiment

Now, in the embodiment of the present invention, a case that the inner ring 10 is manufactured will be described below as an example.

FIG. 3 is a process view of a heat treatment method for obtaining the inner ring shown in FIG. 2. FIG. 4 is a process view which explains a quenching process and a tempering process shown in FIG. 3.

Initially, an annular work W1 (see FIG. 3(a)) formed with the above-described high carbon chromium bearing steel material is manufactured. Then, a cutting work is applied to the obtained annular work W1 to fabricate a prescribed form, and carry out a previous work for obtaining a work W2 having parts corresponding to the inner ring raceway surface 11, the inner peripheral surface 12 and the side surfaced 13 (see FIG. 3(b)).

Then, a quenching process (see FIGS. 3(c) and 4(a)) is applied to the obtained work W2.

In the quenching process, an entire part of the work after the quenching process is preferably uniformly heated, and then, quenched in such a way that the entire part is made of martensite and an incompletely quenched texture (fine pearlite) is 5% or lower. When the above-described incompletely quenched texture exceeds 5%, the hardness of the obtained inner ring 10 may be insufficient, so that the rolling fatigue life is short. A method of the quenching process is not especially limited and a method such as a high frequency quenching, through hardening or the like can be adopted.

The quenching process can be carried out, for instance, under a condition that the work W2 is heated at a quenching temperature of 810 to 850° C. for 0.5 to 2 hours and quickly cooled.

The quenching temperature is preferably 820° C. or higher from the viewpoint that a satisfactory quenching property is ensured, and preferably 840° C. or lower from the viewpoint that crystal gains are prevented from being roughened.

The heating time is preferably 0.5 hours or more from the viewpoint that a member is uniformly heated, and preferably 1.5 hours or less from the viewpoint that the crystal grains are prevented from being roughened.

The quick cooling is carried out, for instance, by oil cooling in an oil bath of cooling oil. Oil bath temperature of the cooling oil is ordinarily 60 to 180° C.

Subsequently, a tempering process is applied to the work W2 to which the quenching process is applied to obtain an intermediate work W3 (see FIG. 3(d), FIG. 4(d)).

The tempering process is carried out in such a way that the work 2 is heated for a prescribed time by an inductively heating under a state that the work W2 is soaked in cooling liquid, and then, the work W2 is cooled in, for instance, the cooling liquid. The work 2 may be cooled in such a way that the inductively heated work W2 is taken out from the cooling liquid and, then, air-cooled, or heat-radiated.

In the tempering process, since the work W2 is heated under a state that the work W2 is soaked in the cooling liquid, as shown in FIG. 4(b), a tempering temperature of a surface of the work W2 (see a "surface temperature A" in FIG. 4) can be set to a temperature lower than a tempering temperature of an inner part of the work W2 (see an "inner temperature B" in FIG. 4).

In the tempering process, since the above-described surface temperature A is set to the temperature lower than the inner temperature B, the inner layer part having the hardness suitable for obtaining the impact resistance can be formed. In addition thereto, since the tempering process is carried out under the above-described conditions, a quantity of retained austenite can be restrained from being reduced during the tempering process and a compression stress can be increased.

At this time, a difference between the surface temperature A and the inner temperature B (the inner temperature B−the surface temperature A) is preferably set to 40° C. or higher, which is suitable to obtain the inner ring 10 having the prescribed inner layer part 15 and the surface layer part 14.

The above-described difference between the surface temperature A and the inner temperature B (the inner temperature B−the surface temperature A) is preferably set to 600° C. or lower. When the difference exceeds 600° C., there is a fear that cracks may possibly appear in the work W2.

Further, in the tempering process, a tempering time (see a "tempering time t" in FIG. 4) is preferably set to 20 seconds or less. Thus, a sufficient compression residual stress can be given to the work W2. More preferably, the tempering time is 18 seconds or less.

The above-described tempering time t is preferably set to 2 seconds or more, and more preferably set to 3 seconds or more from the viewpoint that an occurrence of unevenness in heating is suppressed and the quality of the inner ring is stabilized.

In the present embodiment, the "tempering time" means a current supplying time during the inductively heating.

A specific temperature of the tempering process is preferably adjusted so that the surface temperature is 160 to 290° C. and the inner temperature is 320 to 715° C.

The above-described surface temperature is preferably set to 275° C. or lower from the viewpoint that the rolling fatigue life of the roller bearing is ensured. The above-described inner temperature is more preferably 365° C. or higher and furthermore preferably 450° C. or higher from the viewpoint that the impact resistance is ensured. Further, from the viewpoint that the collapse strength is ensured, 575° C. or lower is preferable. When the inner temperature is 450 to 575° C., a long rolling fatigue life and a high impact resistance can be ensured and high collapse strength is more preferably and suitably ensured.

In the present embodiment, the surface temperature indicates a temperature of a part in which the second raceway surface of the work W2 is formed. Further, the surface temperature and the inner temperature can be measured by a thermocouple of a K type.

In the tempering process, the work 2 is divided into a plurality of blocks along the axial direction depending on the thickness. The thicker block is inductively heated by a frequency the lower than that of the thinner block. FIG. 5 is a view schematically showing a relation between the work and a heating member.

In the embodiment, as shown in FIG. 5, an inside part in a radial direction of a part in which the raceway surface 11 of the work W2 is formed (refer it to as a raceway surface forming part, hereinafter) 111 is divided into three blocks C1 to C3 along the axial direction in accordance with the thickness (a radial dimension of the raceway surface forming part 111 and an inner peripheral surface 112 of the work W2). Further, in outer parts of the work W2 divided into the three blocks C1 to C3, three inductively heating coils 103a to 103c respectively corresponding to the blocks are arranged to induction heat the work W2 by the inductively heating coils 103a to 103c. In this case, the inductively heating coil 103a mainly heats the thinnest block C1. The inductively heating coil 103b mainly heats the secondly thinner block C2. The inductively heating coil 103c mainly heats the thickest block C2. At this time, the inductively heating coil 103a is arranged so as to heat also a part of a diameter side smaller than the block C1 of the work W2 (an inside part in the radial direction of a collar part of the small diameter side) D1. The inductively heating coil 103c is arranged so as to heat also a part of a diameter side larger than the block C3 of the work W2 (an inside part in the radial direction of the collar part of the large diameter side) D2.

In the blocks C1 to C3 respectively, the thicker block is inductively heated by a frequency the lower than that of the thinner block. Namely, the block C3 is heated by the frequency lower than that of the block C2. The block C2 is heated by the frequency lower than that of the block C1. Thus, the work 2 can be heated without unevenness in heating under a preferable temperature condition.

A frequency f for heating the blocks C1 to C3 respectively may be determined in accordance with, for instance, a current penetration depth $\delta$ (mm) and the thickness of the blocks C1 to C3 respectively. For the frequency f, a ratio (T/$\delta$) of the thickness T (mm) of each block C1 to C3 to the current penetration depth $\delta$ (mm) preferably satisfies a below-described inequality (2).

$$1.5 <= T/\delta <= 4.0 \quad (2)$$

The above-described current penetration depth $\delta$ (mm) is represented by a below-described expression (1).

$$\delta = 5.03\sqrt{\rho/\mu f} \quad (1)$$

(In the expression, $\rho$ designates specific resistance ($\mu\Omega \cdot$mm), $\mu$ designates a relative magnetic permeability and f designates a frequency (Hz) of an inductively heating) and a value correlated to the frequency f and an index of the inductively heating condition.

In the present embodiment, when the frequency f is set in such a way that the above-described T/$\delta$ satisfies the above-described inequality (2), a sufficient compression residual stress is adequately applied to the raceway surface 11 of the inner ring 10.

When the above-described T/$\delta$ is smaller than 1.5, since the current penetration depth $\delta$ is too large, currents interfere with each other in the work W2, so that an inner part of the work W2 may not be possibly sufficiently heated.

On the other hand, when T/$\delta$ exceeds 4.0, since the current penetration depth $\delta$ is too small to the thickness of the work, the inner part of the work 2 may not be possibly fully heated also in this case.

Then, when the inner part of the work is insufficiently heated, the compression residual stress of the raceway surface 11 is low in the obtained inner ring 10.

FIG. 6 is a graph showing a summary of a relation between the ratio (T/$\delta$) of the thickness T (mm) to the current penetration depth $\delta$ (mm) and the compression residual stress.

When the tempering process is carried out in which the work is inductively heated under the state that the work is soaked in the cooling liquid, if the above-described T/$\delta$ is too small or too large as shown in FIG. 6, the compression residual stress on the surface of the work after the tempering process is low.

As compared therewith, when the work W2 is divided into the plurality of blocks C1 to C3 to carry out the tempering process, if the frequency f is set in such a way that the above-described T/$\delta$ satisfies the above-described inequality (2) respectively in the inductively heating conditions of the blocks, the sufficient compression residual stress (for instance, 300 MPa or higher) can be applied to the raceway surface 11 of the obtained inner ring 11.

When the frequency f is set in accordance with the above-described inequality (2), for the thickness T of the blocks C1 to C3, the frequency f may be set in such a way that average thickness in the blocks satisfies the above-described inequality (2), or the frequency f may be set in such a way that all ranges of minimum values to maximum values respectively in the blocks satisfy the above-described inequality (2).

For outputs of the inductively heating coils 103a to 103c when the inductively heating is carried out, the thicker block is preferably set to be inductively heated by an output the higher than that of the thinner block. Namely, the block C3 is inductively heated by the output higher than that of the block C2. The block C2 is preferably inductively heated by the output higher than that of the block C1. In this case, the surface temperature and the inner temperature of the blocks are respectively suitably heated at the above-described tempering temperature for the same tempering time.

The tempering temperature may be adjusted by, for instance, changing the tempering time, or by adjusting a current supplying time for each of the induction n heating coils 103a to 103c.

The above-described tempering process may be carried out by using, for instance, a below-described heat treatment device.

FIG. 7(a) is a schematic explanatory view showing a heat treatment device according to the present embodiment. FIG. 7(b) is an enlarged view of main parts of FIG. 7(a).

A heat treatment device 100 shown in FIG. 7 includes a treatment vessel 101 in which the annular work (a work to be heat treated) W2 is set to apply a heat treatment to the work W2, a holding jig 102 which holds the work W2, a heating member 103 arranged in an outer peripheral side of the work W2 so as to surround the work W2 to induction heat the work W2, cooling liquid 105 stored in the treatment vessel 101 to cool the work W2, an injection nozzle 106 which injects the cooling liquid 105 to the work W2 and supply pipes 107A and 107B which supply the cooling liquid 105 to the injection nozzle 106 and the treatment vessel 101.

The treatment vessel 101 is a circular annular vessel having a bottom which can store the cooling liquid 105 and includes a cylindrical inner case 101A and a cylindrical outer case 101B. The above-described vessel forming the treatment vessel 101 is formed with an electrically insulating ceramics or an electrically insulating synthetic resin. In such a way, since the heat treatment device 100 has the vessel formed with the electrically insulating ceramics or the electrically insulating synthetic resin as the treatment vessel 101, the heat treatment device 100 can be restrained from being heated in itself.

The size of the vessel can be suitably set depending on a use of the heat treatment device 100 and the size of the work W2 or the like.

In the treatment vessel 101, the cooling liquid 105 is stored. In the treatment vessel 101, a drain opening 108 is provided which drains excess cooling liquid 105 outside.

In the treatment vessel 101, the work W2 is set so as to be soaked in the cooling liquid 105.

The holding jig 102 includes a jig main body 102a, a support part (a first support part) 102b which bears a lower surface of the work W2 in a point contact and a support part (a second support part) 102c which suppresses a horizontal movement of the work W2. The holding jig 102 holds the work W2 in the point contact and suppresses the horizontal movement of the work W2. At this time, the support part 102c may comes into contact with the work W2 or may have a gap of about 0.5 mm at maximum formed between the work W2 and the holding part. When the above-described gap is provided, even when the work W2 is thermally expanded during heating, the surface of the work W2 can be avoided from being pressed by the support part 102c.

Both the support parts 102b and 102c are spherical members. Accordingly, when the work W2 comes into contact with the support parts 102b and 102c, both the support parts come into contact with the work W2 in the point contact. Thus, a thermal conduction from the work W2 to the support parts 102b and 102c is suppressed, so that the temperature of the work W2 can be prevented from being uneven. Further, since cooling of the work W2 by the cooling liquid 105 is hardly prevented by the support parts 102b and 102c, a superheat of the work W2 due to a shortage of the cooling liquid can be prevented. The number of the support parts 102b and 102c may be respectively three or more at equal intervals in a circumferential direction in plan view, and is ordinarily about three to six and preferably three at equal intervals.

Further, the holding jig 102 is formed with the electrically insulating ceramics or the electrically insulating synthetic resin. Thus, heating of the holding jig 102 itself or unevenness in a surface temperature of the work W2 can be suppressed.

The heating member 103 includes a plurality (for instance, three) of inductively heating coils 103a to 103c installed outside of the outer case 101B and a center core 103d installed inside of the inner case 101A. As already described above, the inductively heating coils 103a to 103c are provided at predetermined positions respectively corresponding to the blocks C1 to C3 of the work W2 which is divided in accordance with the thickness.

The inductively heating coils 103a to 103c are connected to a control part 104. Heating conditions such as frequencies or outputs of the inductively heating coils 103a to 103c are independently controlled respectively for the inductively heating coils by the control part 104.

The inductively heating coils 103a to 103c respectively have spiral forms with inside diameters larger than an outside diameter of the outer case 101B.

The center core 103d is a rod shaped member having an outside diameter smaller than an inside diameter of the inner case 101A and formed with silicon steel.

In the heat treatment device 100, when a current is supplied under a prescribed frequency and output to the inductively heating coil 103, the work W2 can be inductively heated to a desired temperature.

One or both of the inductively heating coils 103a to 103c and the center core 103d may be installed in the treatment vessel 101.

In the heat treatment device 100, the inductively heating coils 103a to 103c are detachably provided in the treatment vessel 101. Accordingly, the heat treatment device can easily and rapidly meet the size of the work W2 or a change in dimension in an axial direction of the divided blocks.

The cooling liquid 105 may be liquid which can cool the surface of the work W2. As the cooling liquid 105, for instance, water, oil, water soluble polymer may be exemplified.

As the above-described oil, for instance, quenching oil may be exemplified.

As the water soluble polymer, for instance, PAG (polyalkylene glycol) or the like may be exemplified. The water soluble polymer can be used as aqueous solution dissolved in water. In this case, a quantity of blending of the water soluble polymer in water can be suitably set depending on the kind of the water soluble polymer.

The cooling liquid 105 is preferably high in its heat transfer rate from the viewpoint that the surface of the work w2 is efficiently cooled, and more preferably, is easily handled.

The injection nozzle 106 is attached to an end part of the supply pipe 107A which supplies the cooling liquid 105 to the treatment vessel 101. The plurality of injection nozzles 106 are provided at prescribed intervals along the circumferential direction of the work W2. The injection nozzles 106 respectively have injection openings 106a arranged so as to be opposed to an outer peripheral surface of the work W2. The injection opening 106a is arranged so as to be close and opposed to a part (a bias line part in FIG. 7(b)) forming the first raceway surface of the work W2.

In the supply pipe 107A, a flow rate regulating valve and a pressure regulating valve (both are not shown in the drawing) are provided. Thus, a supplying condition of the cooling liquid can be adjusted.

In the heat treatment device 100, the cooling liquid 105 supplied through the supply pipes 107A and 107B is stored in the treatment vessel 101 and the excess cooling liquid 105 is drained from the drain opening 108.

The heat treatment device 100 may have a circulation path (not shown in the drawing) which supplies again the drained cooling liquid 105 to the treatment vessel 101.

Additionally, the heat treatment device 100 is provided with necessary members such as a power source required for an inductively heating, a matching device, a temperature adjusting member for controlling the temperature of a cooling agent or the like, which are not shown in the drawing.

Further, the heat treatment device 100 may have a mechanism which rotates the work W2 on an axis during a heating.

In the tempering process using the above-described heat treatment device 100, as described above, the work W2 is set in the treatment vessel 101 to induction heat the work W2 under the state that the work W2 is soaked in the cooling liquid 105.

At this time, the inductively heating by the heating member 103 is carried out, as already described above, under conditions (frequencies and outputs) respectively meeting the blocks after the work W2 is divided into the plurality of blocks depending on the thickness.

Further, in the cooling liquid 105 stored in the treatment vessel 101, the inductively heating is carried out under a state that the flow of the cooling liquid 105 is generated so as to collect the cooling liquid 105 to the part of the work W2 which forms the first raceway surface 11A.

Specifically, the inductively heating may be carried out in such a way that the cooling liquid 105 is supplied under a jet injection from the injection openings 106a of the plurality of injection nozzles 106 toward the part which forms the first raceway surface 11A. Thus, the part which forms the first raceway part 16A of the work W2 can be cooled by a higher cooling power than that of other part. Accordingly, the higher compression residual stress can be applied to the first raceway surface 11A of the inner ring 10 completed via a post-process than that of the second raceway surface 11B.

Further, when this method is adopted, the compression residual stress, which is lower than that of the first raceway surface 11A, can be also applied to the second raceway surface 11B of the inner ring 10.

A quantity of supply of the cooling liquid 105 supplied during the jet injection of the cooling liquid 105 from the injection nozzle 106 depends on the number of the injection nozzles 106, the form or size of the work W2, the cooling power of the cooling liquid or the like, however, the quantity of supply of the cooling liquid may be set to, for instance, 8 to 80 L/min.

Further, the temperature of the cooling liquid 105 supplied from the injection nozzle 106 depends on the form or size of the work W2, the cooling power of the cooling liquid or the like, however, the temperature may be set to, for instance, 5 to 80° C.

Finally, in the intermediate work W3 after the tempering process, a finishing process such as a polishing work is applied (see FIG. 3(e)) to a part corresponding to the inner ring raceway surface 11.

The inner ring 10 (the bearing ring for the roller bearing) can be obtained through the above-described processes.

Second Embodiment

The present embodiment is the same as the first embodiment except that a structure of a heat treatment device used when a tempering process is applied is different. Accordingly, here, only the heat treatment device used in the present embodiment will be described below.

FIG. 8 is an enlarged view of main parts showing the heat treatment device according to the present embodiment.

The heat treatment device 200 has the same structure as that of the heat treatment device 100 shown in FIG. 7(a) and FIG. 7(b) except that an attaching direction of an injection nozzle 206 is different as shown in FIG. 8. In the heat treatment device 200, the same members as those of the heat treatment device 100 are designated by the same reference numerals as those of the heat treatment device 100.

In the heat treatment device 200, an injection nozzle 206 attached to an end part of a supply pipe 107A is arranged in such a way that an injection opening 206a of the injection nozzle 206 is opposed to an inner wall surface of an outer case 101B located in an outer peripheral side of a work W2 and cooling liquid 105 supplied by a jet injection from an injection opening 206a of the injection nozzle 206 is reflected on the inner wall surface of the outer case 101B located in the outer peripheral side of the work W2 and directed toward a part in which a first raceway surface 11A of the work W2 is formed.

In a tempering process using the heat treatment device 200, the work W2 may be installed in a treatment vessel 101 in such a way that the work W2 is soaked in the cooling liquid 105 as in the case that the heat treatment device 100 is used and the cooling liquid 105 may be supplied by a jet injection from the injection openings 206a of the plurality of injection nozzles 206. Similarly in this case, the work W2 can be heated under a state that a flow of the cooling liquid 105 is generated so as to collect the cooling liquid 105 to the part in which the first raceway surface 11A of the work W2 is formed.

Accordingly, the part in which a first raceway part 16A of the work W2 is formed can be cooled by a cooling power higher than that of other part.

As a result, when the heat treatment device 200 is used, a higher compression residual stress can be also applied to the first raceway surface 11A of an inner ring 10 completed via a post-process than that of a second raceway surface 11B. Further, the compression residual stress, which is lower than that of the first raceway surface 11A, can be also applied to the second raceway surface 11B of the inner ring 10.

In the present embodiment, for a quantity of supply of the cooling liquid 105 or the temperature of the cooling liquid 105 when the cooling liquid 105 is supplied by a jet injection from the injection nozzle 206, the same or similar conditions to those when the heat treatment device 100 is used can be adopted.

Other Embodiments

According to the first and second embodiments, in the tempering process, the inside part in the radial direction of the raceway surface forming part 111 of the work W2 is divided into the three blocks. However, when the work W2 is divided into a plurality of blocks in accordance with the thickness, the work W2 may be divided into two blocks or divided into four blocks or more.

Further, when the work W2 is divided into the plurality of blocks, axial dimensions of the blocks do not need to be respectively the same.

In the embodiments of the present invention, as already described above, the inner ring 10 can be obtained in which the first raceway surfaces are provided in two parts of the large diameter side and the small diameter side of the raceway part 16.

When such an inner ring 10 is obtained, for instance, a heat treatment device having injection nozzles provided in such a way that flows of cooling liquid are generated so as to collect the cooling liquid respectively to the parts in which the first raceway surfaces of two positions are formed may be used to carry out the above-described tempering process.

In the heat treatment devices 100 and 200 according to the first and second embodiments, the heating member 103 includes the center core 103d provided inside of the work W2. However, the heat treatment device of the embodiment of the present invention may have a plurality of inductively heating coils corresponding to the inductively heating coils 103a to 103c in an inner part of the work W2 in place of the center core 103d.

Now, operational effects of the present invention will be investigated by referring to examples. The embodiments of the present invention are not limited to below-described examples.

Example 1

An annular work is manufactured from a steel material made of SUJ2. A cutting work is applied to the obtained annular work to fabricate to a prescribed form and obtain a work for an inner ring (outside diameter: 110 mm, a maximum thickness Tmax and a minimum thickness Tmin (see FIG. 5) in a raceway surface forming part 111 are respectively T max=9 mm and Tmin=3 mm). Then, after a quenching process and a tempering process under heat treatment conditions shown in Tables 1 and 2 and FIG. 9 are applied to the obtained work, a polishing work is applied thereto to obtain a test piece for an inner ring for a bearing (model number: equivalent to 385).

Here, the quenching process is carried out by using an atmosphere heat treatment furnace and the tempering process is carried out by using the heat treatment device 100 shown in FIG. 7.

FIG. 9 is a diagram showing a heat treatment condition in the example 1.

In the present example, as shown in FIG. 9, the work is heated at 830° C. for 0.5 hours to quench an entire part, and then, the work is oil cooled to 80° C.

After that, the work is set in the heat treatment device 100 shown in FIG. 7 to carry out the tempering process.

In the above-described tempering process, the work is divided into below-described three (i) to (iii) along an axial direction and the blocks are respectively inductively heated under different heating conditions.

Specifically, (i) the work is divided into an intermediate block C2 having a thickness of 5 mm or larger and smaller than 7 mm in a raceway surface forming part 111, (ii) a thin block C1 having a thickness of 3 mm or larger and smaller than 5 mm and a part D1 of a diameter side smaller than that of the thin block C1 and (iii) a thick block C3 having a thickness of 7 mm or larger and 9 mm or smaller and a part D2 of a diameter side larger than that of the thick block C3 (see FIG. 5). By using frequencies and outputs of inductively heating coils 103a to 103c respectively installed outside of the blocks (i) to (iii) shown in the Table 2 as conditions, the blocks are inductively heated for 5 seconds. The above-described T/δ to the blocks C1 to C3 is shown together in the Table 2.

Further, the tempering process is carried out under a state that the quenched work is soaked in water (cooling liquid) of 25° C. At this time, the cooling water is jet injected from an injection nozzle 106 in a flow rate of 20 L/min at the same time as a start of heating.

In the above-described tempering process, a temperature of a part in which a first raceway surface is formed during an inductively heating (refer it simply to as a temperature of a first raceway surface in an explanation of examples/comparative examples) t1 is 145° C. A temperature of a part in which a second raceway surface is formed (refer it simply to as a temperature of a second raceway surface in an explanation of examples/comparative examples) t2 is 195° C. A temperature of a part of an inner layer part (refer it simply to as an inner temperature in an explanation of examples/comparative examples) t3 is 480° C.

The temperature t1 of the first raceway surface is measured in a central part in an axial direction on the first raceway surface (see P in FIG. 2). The temperature t2 of the second raceway surface is measured in a central part in the axial direction on the second raceway surface (see Q in FIG. 2). The inner temperature t3 is measured at a position (see R in FIG. 2) which enters to a part ½ as large as a thickness of a central part in the axial direction on the raceway surface toward an inner side in a radial direction from that part in a cut section (see FIG. 2) formed when the work is cut along the radial direction.

Examples 2, 3

A test piece of an inner ring is obtained in the same manner as that of the example 1 except that a flow rate of cooling water jet injected from an injection nozzle 106 during a tempering process is changed as shown in the Table 2.

Further, tempering temperatures in the examples respectively (a temperature t1 of a first raceway surface, a temperature t2 of a second raceway surface and an inner temperature t3) are shown in the Table 1.

Comparative Example 1

A test piece for an inner ring is obtained in the same manner as that of the example 1 except that a tempering process is carried out by using a tempering furnace under conditions shown in FIG. 10.

FIG. 10 is a diagram showing a heat treatment condition in a comparative example 1. In the comparative example 1, a work is heated at 830° C. for 0.5 hours to quench an entire part, and then, the work is oil cooled to 80° C. After that, the work is heated at 180° C. (Both a temperature t2 of a raceway surface and an inner temperature t3 are 180° C.) for 1.5 hours to carry out the tempering process.

The temperature of the raceway surface is measured at the same position as that of the temperature of the second raceway surface in the example 1.

Comparative Example 2

A work for an inner ring made of SUJ2 is obtained in the same manner as that of the example 1.

Then, a carbonitriding quenching process is applied to the obtained work under a heat treatment condition shown in FIG. 11 in a carbonitriding atmosphere in which a carbon potential is 1.1 and a concentration of ammonia gas is 6 volume %. After that, the same tempering process as that of the comparative example 1 is applied thereto and a polishing work is applied to obtain a test piece for an inner ring for a bearing (model number: equivalent to 385).

FIG. 11 is a diagram showing a heat treatment condition in a comparative example 2. In the comparative example 2, the work is heated at 840° C. for 4 hours to carryout the carbonitriding quenching process, and then, the work is oil cooled to 80° C. After that, the work is heated at 180° C. for 1.5 hours to carry out the tempering process.

Comparative Example 3

An annular work is manufactured from a steel material made of SAE4320. A cutting work is applied to the obtained annular work to fabricate to a prescribed form and obtain a work for an inner ring having the same size as that of the example 1. Then, a quenching process is carried out to the obtained work by using an atmosphere heat treatment furnace under heat treatment conditions shown in FIG. 12. Then, the same tempering process as that of the comparative example 1 is applied to the work, and then, a polishing work is applied thereto to obtain a test piece for an inner ring for a bearing (model number: equivalent to 385).

FIG. 12 is a diagram showing a heat treatment condition in a comparative example 3. In the comparative example 3, the work is heated at 850° C. for 5 hours to carry out the quenching process, and then, the work is oil cooled to 80° C. After that, the work is heated at 180° C. for 1.5 hours to carry out the tempering process.

Comparative Examples 4 to 6

A test piece for an inner ring is obtained in the same manner as that of the example 1 except that conditions (frequencies and outputs) of an inductively heating during a tempering process are changed as shown in the Table 2, an entire part of a work is heated by the same frequency and a jet injection of cooling water by using an injection nozzle 106 is not carried out.

Comparative Examples 7, 8

A test piece for an inner ring is obtained in the same manner as that of the example 1 except that conditions (frequencies and outputs) of an inductively heating during a tempering process are changed as shown in the Table 2, an entire part of a work is heated by the same frequency and a flow rate of cooling water injection jetted from an injection nozzle 106 during the tempering process is set to a flow rate shown in the Table 2.

Comparative Examples 9 to 10

A test piece for an inner ring is obtained in the same manner as that of the example 1 except that conditions (frequencies and outputs) of an inductively heating during a tempering process are set as shown in the Table 2, and a jet injection of cooling water by using an injection nozzle 106 is not carried out.

TABLE 1

|  | Kind of steel | Heat treatment | Tempering condition |
|---|---|---|---|
| Example 1 to 3, comparative example 1, 4 to 10 | SUJ2 | Quenching and tempering | 830° C.-0.5 h |
| Comparative example 2 | SUJ2 | Carbonitriding quenching and tempering | 840° C.-4 h |
| Comparative example 3 | SAE4320 | Quenching and tempering | 850° C.-5 h |

TABLE 2

| | Tempering condition | | | | | | | | |
|---|---|---|---|---|---|---|---|---|---|
| | Thickness 3 mm or larger, smaller than 5 mm | | | Thickness 5 mm or larger, smaller than 7 mm | | | Thickness 7 mm or larger, smaller than 9 mm | | |
| | Frequency (kHz) | Output (kW) | T/δ | Frequency (kHz) | Output (kW) | T/δ | Frequency (kHz) | Output (kW) | T/δ |
| Example 1 | 3.0 | 31.25 | 2 to 3 | 1.5 | 37.5 | 2 to 3 | 0.5 | 56.25 | 2 to 3 |
| Example 2 | 3.0 | 31.25 | 2 to 3 | 1.5 | 37.5 | 2 to 3 | 0.5 | 56.25 | 2 to 3 |
| Example 3 | 3.0 | 31.25 | 2 to 3 | 1.5 | 37.5 | 2 to 3 | 0.5 | 56.25 | 2 to 3 |
| Comparative example 1 | — | — | — | — | — | — | — | — | — |
| Comparative example 2 | — | — | — | — | — | — | — | — | — |
| Comparative example 3 | — | — | — | — | — | — | — | — | — |
| Comparative example 4 | 1.5 | 69 | 1 to 1.5 | 1.5 | 63 | 2 to 3 | 1.5 | 63 | 4.5 to 5 |
| Comparative example 5 | 0.5 | 69 | 0.5 to 1 | 0.5 | 65 | 0.5 to 1.5 | 0.5 | 66 | 2 to 3 |
| Comparative example 6 | 3.0 | 60 | 2 to 3 | 3.0 | 65 | 4 to 5 | 3.0 | 65 | 5 to 6 |
| Comparative example 7 | 0.5 | 69 | 1.5 to 2 | 0.5 | 65 | 0.5 to 1.5 | 0.5 | 66 | 2 to 3 |
| Comparative example 8 | 0.5 | 69 | 0.5 to 1 | 0.5 | 68 | 0.5 to 1.5 | 0.5 | 63 | 2 to 3 |
| Comparative example 9 | 3.0 | 24 | 2 to 3 | 0.5 | 48 | 0.5 to 1.5 | 0.5 | 48 | 2 to 3 |
| Comparative example 10 | 3.0 | 30 | 2 to 3 | 1.5 | 36 | 2 to 3 | 0.5 | 54 | 2 to 3 |

TABLE 2-continued

|  | | | Tempering condition | | | |
|---|---|---|---|---|---|---|
|  | Total output (kW) | Heating time | Temperature (° C.) of raceway surface (second raceway part) | Temperature (° C.) of first raceway surface | Inner temperature (° C.) | Flow rate of cooling liquid by jet injection (L/min) |
| Example 1 | 125 | 5 sec | 195 | 145 | 480 | 20 |
| Example 2 | 125 | 5 sec | 180 | 135 | 485 | 40 |
| Example 3 | 125 | 5 sec | 165 | 125 | 490 | 60 |
| Comparative example 1 | — | 1.5 h | 180 | — | 180 | — |
| Comparative example 2 | — | 1.5 h | 180 | — | 180 | — |
| Comparative example 3 | — | 1.5 h | 180 | — | 180 | — |
| Comparative example 4 | 195 | 5 sec | 220 | 230 | 480 | 0 |
| Comparative example 5 | 200 | 5 sec | 210 | 210 | 490 | 0 |
| Comparative example 6 | 190 | 5 sec | 290 | 295 | 250 | 0 |
| Comparative example 7 | 200 | 5 sec | 195 | 145 | 475 | 40 |
| Comparative example 8 | 200 | 5 sec | 180 | 135 | 470 | 60 |
| Comparative example 9 | 120 | 5 sec | 215 | 200 | 420 | 0 |
| Comparative example 10 | 125 | 5 sec | 200 | 185 | 520 | 0 |

(Evaluation of Test Piece)

For the test pieces of the examples 1 to 3 and the comparative examples 1 to 10, the Vickers hardness of the raceway surface (the first raceway surface and the second raceway surface), the hardness of the inner layer part, the compression residual stress, the rolling fatigue life, the collapse strength, Charpy impact value and a cost are examined. Further, the textures of the surface layer parts and the inner layer parts of the inner rings are respectively observed by an optical microscope.

The Vickers hardness of the raceway surface is measured by applying the Vickers pressure member to a central part in the axial direction in the raceway surface (the first raceway surface and the second raceway surface of the test piece of each inner ring.

As the hardness of the inner layer part, hardness is set which is measured by applying the Vickers pressure member to a position which enters to a part ½ as large as the thickness of a central part in the axial direction on the raceway surface toward an inner side in a radial direction from that part in a cut surface (see FIG. 2) formed by cutting the test piece of the inner ring along the radial direction.

The compression residual stress is measured by carrying out an X-ray diffraction method by using a residual stress measuring device.

The rolling fatigue life is measured by carrying out a radial type rolling fatigue life test.

The collapse strength is measured in such a way that a first part in a circumferential direction of the test piece of the inner ring and a second position which moves by 180° in the circumferential direction from the first position in the circumferential direction are held in a radial direction by Amsler test machine and the test piece is moved so that the first part and the second part come close to each other at a speed of 0.5 mm/min along a direction vertical to an axis of the test piece which connects the first part and the second part, and accordingly, the test piece is deformed and broken and a radial load is measured when the test piece is broken.

The Charpy impact value is measured in accordance with JIS K7111-1.

These results are shown in Table 3. The rolling fatigue life, the collapse strength and the Charpy impact value are calculated as relative values to measured values of the comparative example 1. Further, in the Table, a round mark in the cost means a numerical value equal to or lower than an evaluated numerical value of the inner ring of the comparative example 1.

TABLE 3

|  | Main texture of surface layer part | Main texture of inner layer part | Hardness of surface (HV) | | Hardness of inner layer part(HV) | Compression residual stress (MPa) | | Rolling fatigue life (relative value) | Collapse strength (relative value) | Charpy impact value (relative value) | cost |
|---|---|---|---|---|---|---|---|---|---|---|---|
|  |  |  | Second raceway surface | First raceway surface |  | Second raceway surface | First raceway surface |  |  |  |  |
| Example 1 | High carbon martensite | Low carbon martensite | 750 | 770 | 545 | 340 | 380 | 1.60 | 1.25 | 1.10 | ○ |
| Example 2 | High carbon martensite | Low carbon martensite | 760 | 785 | 540 | 370 | 410 | 1.65 | 1.30 | 1.10 | ○ |

TABLE 3-continued

|  | Main texture of surface layer part | Main texture of inner layer part | Hardness of surface (HV) | | Hardness of inner layer part(HV) | Compression residual stress (MPa) | | Rolling fatigue life (relative value) | Collapse strength (relative value) | Charpy impact value (relative value) | cost |
|---|---|---|---|---|---|---|---|---|---|---|---|
|  |  |  | Second raceway surface | First raceway surface |  | Second raceway surface | First raceway surface |  |  |  |  |
| Example 3 | High carbon martensite | Low carbon martensite | 770 | 799 | 535 | 390 | 450 | 1.80 | 1.30 | 1.15 | ○ |
| Comparative example 1 | High carbon martensite | High carbon martensite | 740 |  | 740 | 0 | — | 1.00 | 1.00 | 1.00 | — |
| Comparative example 2 | High carbon martensite | High carbon martensite | 783 |  | 782 | 0 | — | 1.20 | 1.20 | 1.00 | X |
| Comparative example 3 | High carbon martensite | Low carbon martensite | 753 |  | 550 | 207 | — | 1.00 | 1.00 | 1.50 | X |
| Comparative example 4 | High carbon martensite | Low carbon martensite | 721 | 725 | 540 | 180 | 180 | 1.18 | 1.00 | 1.00 | ○ |
| Comparative example 5 | High carbon martensite | Low carbon martensite | 735 | 735 | 535 | 190 | 195 | 1.18 | 1.00 | 1.00 | ○ |
| Comparative example 6 | High carbon martensite | Low carbon martensite | 660 | 670 | 710 | 85 | 80 | 0.85 | 0.80 | 0.70 | ○ |
| Comparative example 7 | High carbon martensite | Low carbon martensite | 752 | 780 | 540 | 301 | 320 | 1.35 | 1.10 | 1.00 | ○ |
| Comparative example 8 | High carbon martensite | Low carbon martensite | 760 | 798 | 538 | 317 | 350 | 1.50 | 1.10 | 1.00 | ○ |
| Comparative example 9 | High carbon martensite | Low carbon martensite | 725 | 750 | 529 | 220 | 280 | 1.20 | 1.10 | 1.00 | ○ |
| Comparative example 10 | High carbon martensite | Low carbon martensite | 705 | 718 | 478 | 305 | 330 | 1.45 | 1.10 | 1.20 | ○ |

As apparent from the results shown in the Table 3, according to the embodiment of the present invention, the bearing ring for the tapered roller bearing (the examples 1 to 3) can be obtained which has the first raceway surface high in its compression residual stress in the raceway surface. Such a bearing ring for the tapered roller bearing is excellent in its collapse strength and Charpy impact value and the rolling fatigue life is apparently outstandingly improved.

REFERENCE SIGNS LIST

1 . . . tapered roller bearing 10 . . . inner ring 11 . . . inner ring raceway surface 11A . . . first raceway surface 11B . . . second raceway surface 12 . . . inner peripheral surface 13 . . . side surface 14 . . . surface layer part 15 . . . inner layer part 16 . . . raceway part 16A . . . first raceway part 16B . . . second raceway part 17A, 17B . . . non-raceway part 18 . . . collar part 20 . . . outer ring 21 . . . outer ring raceway surface 30 . . . tapered roller 31 . . . rolling surface 31a, 31b . . . edge part 32, 33. roller end face 40 . . . holder 100, 200 . . . heat treatment device 101 . . . heat treatment vessel 101A . . . inner case 101B . . . outer case 102 . . . holding jig 103 . . . heating member 103a to 103c . . . inductively heating coil 104 . . . center core 105 . . . cooling liquid 106, 206 . . . injection nozzle 107A, 10B . . . supply pipe 108 . . . drain opening W1 . . . annular work W2 . . . work W3 . . . intermediate work

The invention claimed is:

1. A manufacturing method of a bearing ring for an annular roller bearing, the annular roller bearing including an inner layer part, a surface layer part which surrounds an entire part of a periphery of the inner layer part and has Vickers hardness on a surface higher than that of the inner layer part, a first raceway surface having a compression residual stress and including a part which comes into contact with at least one end of a rolling surface of a roller in an axial direction and a second raceway surface having a compression residual stress lower than that of the first raceway surface are provided, and wherein a thickness changes in the axial direction, the manufacturing method comprising:

(A) applying a quenching process to a work which is annular, made of high carbon chromium bearing steel, and having the thickness changing in an axial direction;

(B) applying a tempering process to the work which is quenched to entirely soak the work in cooling liquid and inductively heat the work in a state that the work is soaked in the cooling liquid; and (C) applying a polishing process to the work which is tempered, wherein the process (B) is carried out (B1) in such a way that the work has a plurality of blocks along the axial direction, wherein each of the blocks has the thickness that is different from one another, one of the blocks that the thickness is thinner is inductively heated in a frequency, and the other of the blocks that is thicker than the one of the blocks is inductively heated in a lower frequency than the frequency applied to the one of the blocks;

(B2) under a state that a flow of the cooling liquid is generated so as to collect the cooling liquid to a part in which a first raceway surface of the work is formed in the cooling liquid in which the work is soaked; and (B3) such that a temperature of a portion in which the second raceway surface is formed is 160 to 290° C., and a temperature of a portion to be the inner layer part is 320 to 715° C.

2. A manufacturing method according to claim 1, wherein in the process (B), an injection nozzle which injects the cooling liquid is used and an injection opening of the injection nozzle is opposed to the part in which the first raceway surface is formed to inject the cooling liquid to the part in which the first raceway surface is formed from the injection opening.

* * * * *